United States Patent [19]

Molaro et al.

[11] Patent Number: 5,037,253

[45] Date of Patent: Aug. 6, 1991

[54] APPARATUS FOR MAKING VENETIAN BLINDS

[75] Inventors: Michael J. Molaro, North Haledon; Thomas Buttitta, Garfield, both of N.J.

[73] Assignee: Levolor Corporation, Sunnyvalle, Calif.

[21] Appl. No.: 445,447

[22] Filed: Dec. 4, 1989

[51] Int. Cl.[5] .................................................. B23C 3/00

[52] U.S. Cl. .................................... 409/190; 29/24.5; 144/5; 269/303; 409/197; 409/219; 409/225

[58] Field of Search ............... 409/189, 219, 220, 184, 409/190, 191, 197, 205, 218, 225; 29/24.5; 408/95, 98, 108; 144/5, 6, 286, 288.5 R; 269/303, 305

[56] References Cited

U.S. PATENT DOCUMENTS 4,610,582 9/1986 Amos et al. .......................... 408/98

4,639,987 2/1987 Georgopoulos .................... 29/24.5

*Primary Examiner*—Z. R. Bilinsky

[57] ABSTRACT

An apparatus and method are provided for finishing the fabrication of venetian blinds at or near a point of purchase. The blinds are shipped to the point of purchase in a partially completed condition wherein the slats of the blinds have registered apertures formed in spaced relationship to one end of each slat, but with the opposed end being free of such apertures. An interlacing support and a pull cord are mounted to the ends of the slats having the apertures formed therein. The overall length of the slats exceeds the width of the window for which the blinds are intended. Apertures are then cut into the blinds at a selected distance from the trimmed ends. The blinds are completed by appropriately mounting a second interlacing support and pull cord in proximity to the trimmed ends of the blind.

2 Claims, 4 Drawing Sheets

APPARATUS FOR MAKING VENETIAN BLINDS

BACKGROUND OF THE INVENTION

Venetian blinds comprise a plurality of substantially identical generally flat elongated slats disposed in a parallel array. Each slat comprises a pair of elongated apertures at equal preselected distances from the opposed respective ends of the slat. The longitudinal axes of the elongated apertures are substantially parallel to one another and orthogonal to the longitudinal axis of the associated slat. The apertures in each slat are disposed to be substantially in register with the corresponding apertures in the other slats of the array.

Venetian blinds further comprise a pair of interlaced flexible support structures extending transverse to the slats in the array and generally in line with the respective apertures formed in the slats. Each interlaced support structure comprises a pair of runners disposed on opposite respective sides of the slats and transverse supports extending between the runners at equally spaced locations therealong. The runners are operative to support each respective slat and to adjust the angular alignment of the slats relative to the runners. The transverse supports may be alternately staggered on opposite respective sides of the apertures in the slats.

The blinds further comprise pull cords extending through the registered apertures. One end of each pull cord and one end of each runner in the interlaced support is fixedly secured to the bottom most slat which may be more rigid than other slats in the array. The opposed ends of the pull cords and the runners extend into a channel in which an elongated control rod is rotatably mountable.

Control cords extend from the channel to permit adjustment of the blinds. In particular selected movement of the control cords enables rotation of the rod to generate corresponding longitudinal movement of the runners relative to one another, thereby altering the angular alignment of the transverse supports and the slats relative to the runners. The pull cords which pass through the aligned apertures in the slats also extend from the channel. Appropriate adjustment of the pull cords enables the controlled collapsing or extension of the array of slats defining the blinds.

The slats of venetian blinds have been formed from many materials, including wood, plastic and metal. Blinds having thin metal slats are considered very desirable in view of their light weight, their ability to reflect light and heat and their aesthetic appearance. The prior art metal blinds typically are manufactured from a coil of thin metal strip material. The coil is unwound into an apparatus which cuts slats to specified lengths and punches the apertures therein at specified distances inwardly from the opposed ends of each slat. The punch forming of the holes in the metal slats must be very precise to avoid creating burrs or edge irregularities in the metal material that could wear the cords passing therethrough or that could injure a person dusting, adjusting, or otherwise manipulating the blinds. This prior art apparatus may also be operative to form the metal material into an arcuate cross section along the length of the slat. The slats are interlaced with the interlacing support and the cord is directed through the apertures. The cords and the interlacing are then appropriately connected to the control means in the upper channel of the venetian blinds.

Although the prior art venetian blinds and apparatus for making blinds are extremely desirable, it has been necessary to custom manufacture every venetian blind to match the window dimensions of the consumer. This custom manufacturing has been perceived as a marketing limitation in that many consumers prefer to receive products substantially at the time the request for the product is made. This virtual instantaneous availability of venetian blinds generally has not been available in the prior art.

The prior art includes modular wooden blinds to facilitate fabricating blinds to match specified window dimensions. Examples of these modular blinds are shown in U.S. Pat. No. 4,333,509 and U.S. Pat. No. 2,170,938. Although these modular approaches could be attempted for wooden or plastic blinds, they can not be adapted to blinds formed from thin metal slats.

In view of the above, it is an object of the subject invention to provide a partly assembled kit of venetian blind components that can be finished to specified window dimensions.

It is another object of the subject invention to provide a method for making venetian blinds wherein several final assembly steps can be completed substantially at the point of purchase.

It is an additional object of the subject invention to provide a discontinuous manufacturing process for venetian blinds wherein a plurality of manufacturing and assembly steps can be carried out at a first location and wherein the remaining steps can be carried out at the point of purchase.

It is a further object of the subject invention to provide apparatus for final manufacturing steps for venetian blinds.

Still another object of the subject invention is to provide a precision aperture forming apparatus for forming registered apertures in the metal slats of venetian blinds.

Yet another object of the subject invention is to provide an assembly of apparatus for cutting partially assembled metal venetian blinds to specified dimensions and for forming registered apertures in the metal slats of the blinds.

SUMMARY OF THE INVENTION

The subject invention is directed to a method and apparatus that permits metal venetian blinds to be partly manufactured and assembled at a first location and to be finally manufactured and assembled at a second location in proximity to a point of purchase.

The venetian blinds of the subject invention comprise a parallel array of elongated metal slats having opposed first and second ends and registered elongated apertures formed in proximity to the first end of each slat. The partially manufactured and partially assembled venetian blinds may comprise a first interlacing support aligned with the apertures in proximity to the first end, and may further comprise the pull cords extending through the registered apertures. The metal slats of the partially manufactured and partially assembled venetian blinds have lengths equal to or greater than the required width for a specified window. The metal slats of the partly assembled blinds do not have the required second apertures in proximity to the second ends thereof.

The blinds of the subject invention may be completed at or in proximity to the point of purchase by cutting the metal slats to a specified length in accordance with the window dimensions specified by the consumer. For this purpose, the invention comprises cutting means for cutting the slats in proximity to the second end of the slats to define blinds of the specified width. The cutting means may comprise a table having an adjustably positionable stop against which the first end of the slats may be positioned, and a blade for transversely shearing the slats in proximity to the second ends thereof. The cutting means may comprise clamp means for positively aligning and securely positioning the slats in proximity to the cut. The clamp means may comprise a pair of side clamping walls for aligning the slats in a parallel stacked array and a top clamp adjustably movable for holding the stacked array of slats in a tightly nested condition. The top clamp may have an arcuate clamping face substantially conforming to the arcuate cross section of the slats. The blade may be non-linear to define rounded corners at the second end of the respective slats and may be movable under an appropriate selected source of power, such as pneumatic power, hydraulic power, or appropriate electro/mechanical power.

The blind subassembly that has been trimmed to the specified width is then presented to apparatus for forming the second array of registered apertures therein. The apparatus for forming the second apertures preferably comprises a stop means against which the trimmed second ends of the slats are urged. Clamp means may be disposed in proximity to the stop means for securely holding the slats of the blinds in a tightly nested stacked array. The clamp means may be similar to that described above with respect to the cutter. The aperture forming apparatus may further comprise routing means for routing the elongated second apertures in the blinds. The routing means may be spaced from the stop means a distance substantially corresponding to the distance between the first ends of the slats and the first apertures. The routing means may be operative to move in alternate transverse directions relative to the slats for cutting the elongated apertures therein and to incrementally advance into the tightly nested stacked array after completing each transverse movement. Thus, the router may complete one transverse movement, advance into the stacked array and then complete the opposite and returning transverse movement. This stepped cutting movement is effective to create highly finished edges about the elongated apertures, with no burrs that could damage a cord inserted therethrough or that could injure a person cleaning or otherwise manipulating the blinds. The routing means may be operative to retract after completing the cut through the stacked array of blinds to enable the blinds to be removed from the apparatus.

The assembly is completed by positioning the second interlaced support over the second end of the slats, and urging the second lifting cord therethrough. A top channel with control rods is then mounted to the blinds to complete the assembly.

DETAILED DESCRIPTION OF THE PREFERRED EMBODIMENTS

Figure 1:
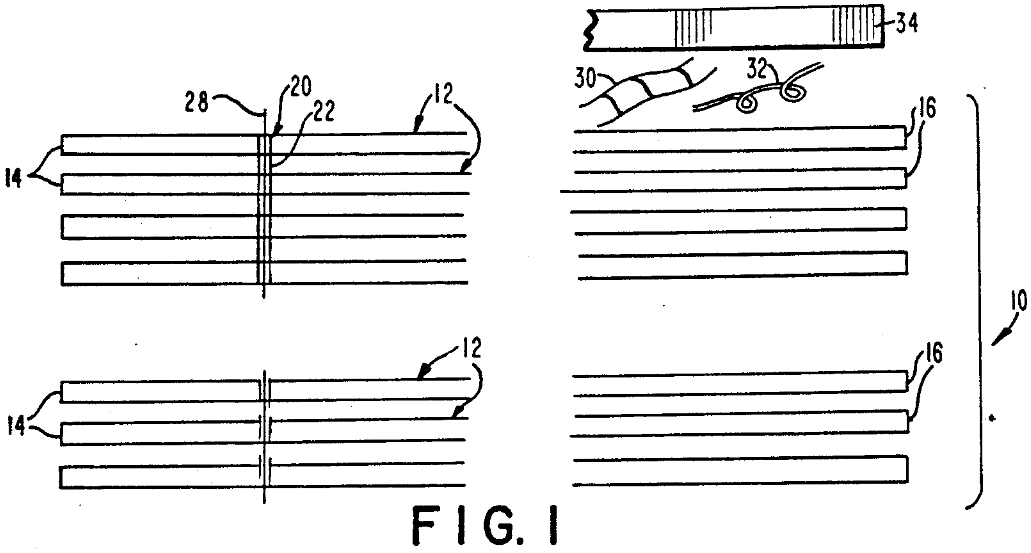
FIG. 1 is a front elevational view of a partially assembled blind in accordance with the subject invention.
Figure 2:
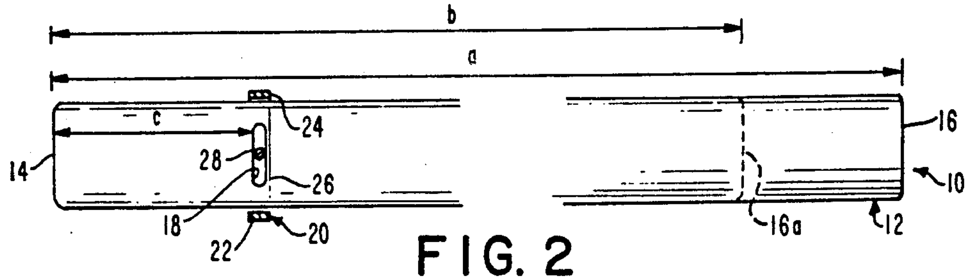
FIG. 2 is a top plan view of the blinds shown in FIG. 1.

The partially completed and partially assembled venetian blinds of the subject invention are illustrated in FIGS. 1 and 2, and are identified generally by the numeral 10. The blinds 10 comprise a plurality of substantially identical slats 12 each of which has a first end 14 and an initial second end 16. The distance "a" defines the length of each slat 12 and the width of the blinds 10. The dimension "a" is at least equal to, and most typically greater than the required width of a window for which the blinds 10 will be purchased. In this regard, the length "b" shown in FIG. 2 identifies the required final width for the blinds 10 as determined by the dimensions of the window. It will be appreciated that in accordance with the subject invention a plurality of different stock sizes of partially completed blinds 10 may be available at a point of purchase. The retailer would select a blind 10 having the width "a" which is nearest to but greater than the specified width "b" to fit the window of a consumer.

Each slat 12 of the blinds 10 is provided with a first aperture 18 extending therethrough at selected distances "c" from the first end 14 thereof, such that the first apertures 18 of the slats 12 are in register with one another. As shown most clearly in FIG. 2, each aperture 18 is elongated, with the direction of elongation of each aperture 18 extending substantially orthogonal to the longitudinal axis of each slat 12.

The blinds 10 are further provided with an interlacing support 20 having a pair of opposed runners 22 and 24 extending along opposite sides of the slats 12 and having transverse supports 26 extending between and connecting the runners 22 and 24 and passing between the respective slats 12. The first interlaced support 20 is disposed substantially in line with the registered first apertures 18 in the slats 12 such that alternate transverse supports 26 are disposed generally on opposite sides of the respective first apertures 18. The blinds 10 further comprise a first pull cord 28 extending through the registered apertures 18 and affixed to the bottommost slat 12 in the blinds 10.

It will be noted that the metal slats 12 comprising the venetian blinds 10 have no second aperture adjacent the second initial end 16. The blinds 10 may be delivered to a retailer as part of a kit which further comprises a second interlacing support 30 and a second pull cord 32 initially separated from the blinds 10, plus a channel 34 for mounting in proximity to the uppermost slat 12 of the blinds 10. The channel 34 may comprise the controls to which the first and second interlaced supports 20 and 30, and the first and second pull cords 28 and 32 may be connected. The channel 34 may also define an initial length "a" and may be trimmed to a specified length "b" by conventional tools. Rough edges or burrs that may be created by the finishing of the channel 34 generally would not be an operational or aesthetic problem in view of the prior art mounting brackets that would cover the opposed trimmed ends of the channel 34. However, conventional tools could not be employed to provide the precisely finished trimmed second ends and second apertures in the thin metal slats 12.

Figure 3:
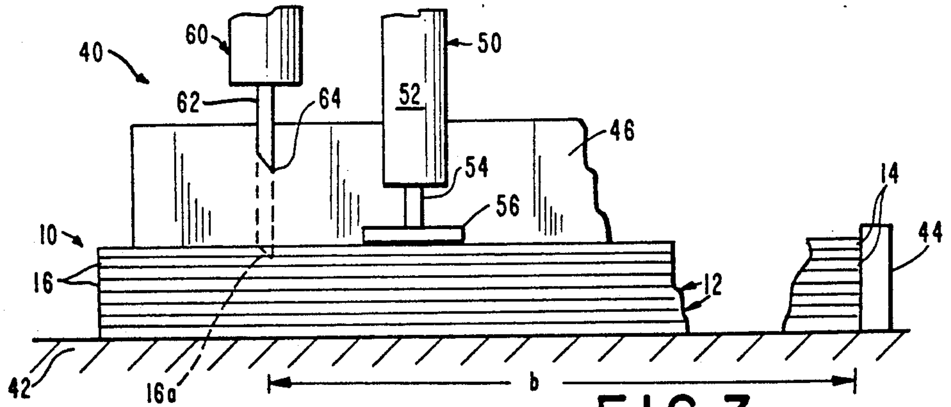
FIG. 3 is a side elevational view of a cutter apparatus in accordance with the subject invention.
Figure 4:
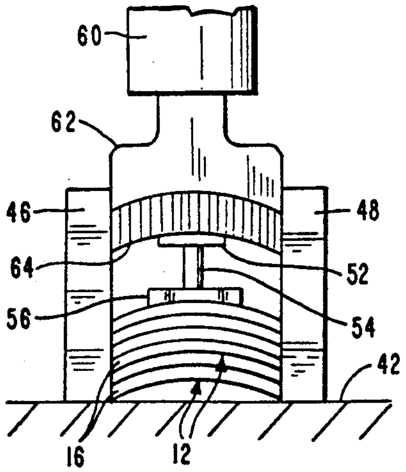
FIG. 4 is an end elevational view of the cutter shown in FIG. 3.
Figure 5:
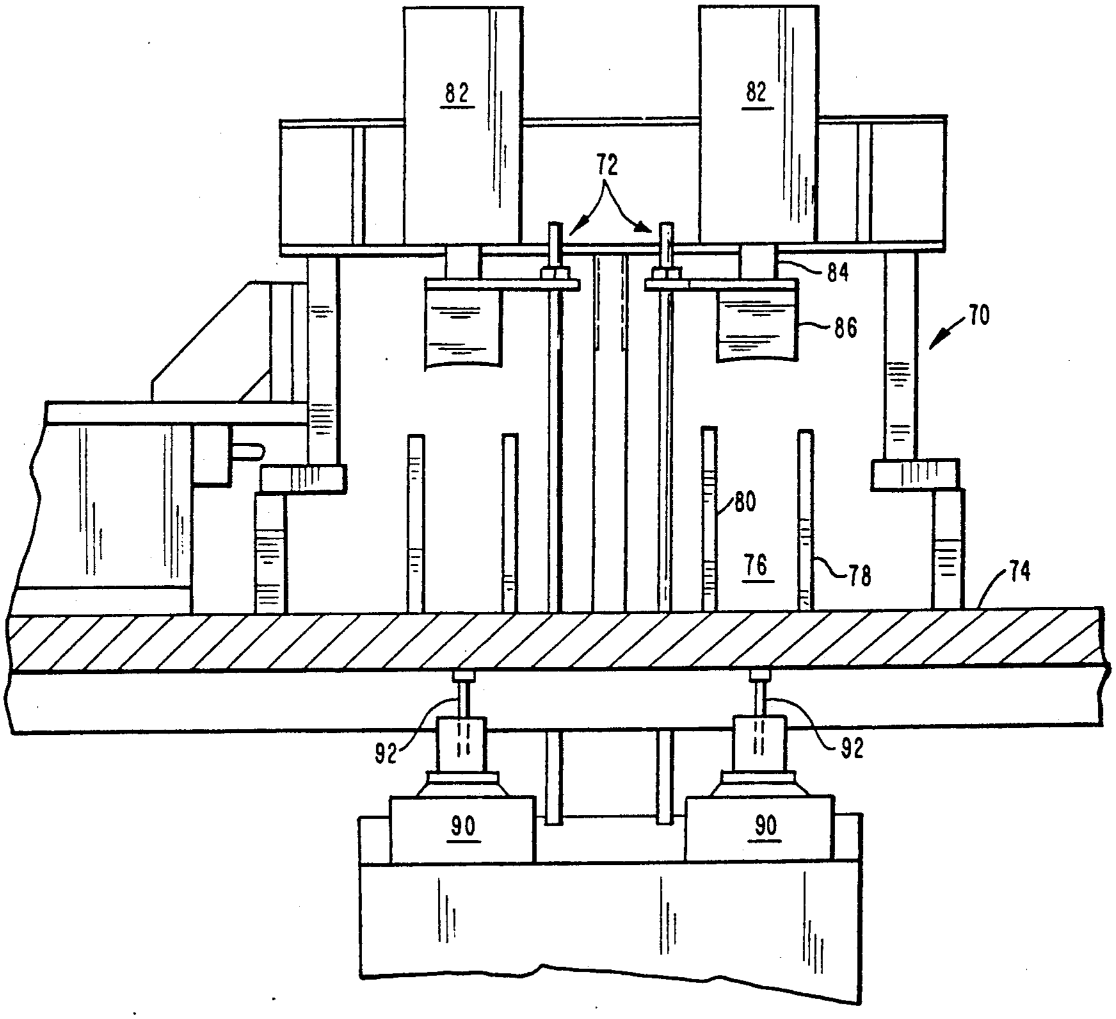
FIG. 5 is an end elevational view of the routing apparatus of the subject invention.
Figure 6:
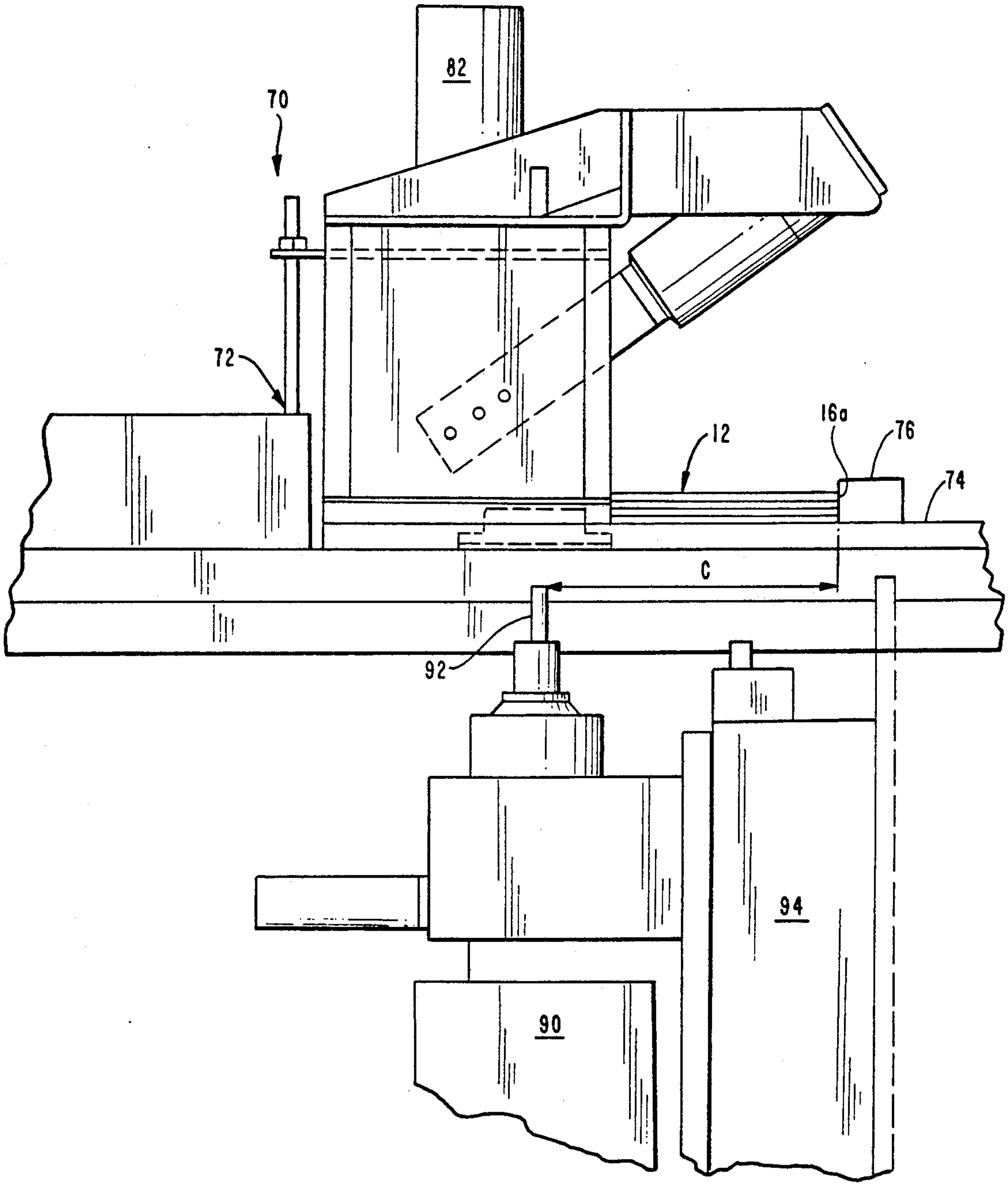
FIG. 6 is a side elevational view of the routing apparatus shown in FIG. 5.

The blinds 10 shown in FIGS. 1 and 2 are trimmed to a specified width "b" by cutting a selected portion of the blinds 10 adjacent the ends 16 of the slats 12 which comprise the blinds 10. With reference to FIGS. 3 and 4, the blinds 10 are mounted in a tightly nested stacked array in a cutting apparatus indicated generally by the numeral 40. The cutting apparatus 40 comprises a base 42 and a stop 44 adjustably movable relative to the base 42. The base 42 may comprise numerical indicia to identify the position for the stop 44 to be disposed relative to the base 42 to achieve blinds 10 of a selected width "b". The cutter 44 further comprises a pair of parallel guides 46 and 48 spaced from one another by a distance corresponding to the width of the slats 12. A clamp apparatus 50 is disposed in proximity to the guides 46 and 48 to ensure tight nesting of the slats 12 adjacent the second ends 16. The clamp apparatus comprises a pneumatically powered cylinder 52 from which a piston 54 extends. The free end of the piston includes a clamp 56 having a contoured face substantially conforming to the arcuate crosssectional form of the slats 16. The clamp apparatus 50 is operative to retain the slats 12 in a tightly nested stacked array during cutting.

The cutter apparatus 40 further comprises a cutter 60 having a blade 62. The cutter may comprise a pneumatically powered cylinder from which the blade 62 is movable. The blade 62 preferably defines a cutting surface 64 which is arcuately configured, as shown in FIG. 4 to substantially conform to the arcuate cross-sectional configuration of the slats 12 comprising the blinds 10. The blade 62 is further arcuately configured to cut rounded corners at the opposed side edges of each slat 12.

The cutting apparatus 40 is operated by first positioning the stop 44 at the desired location depending upon the specified width "b" for the blinds 10. The blinds 10 are then urged between the guides 46 and 48, and the clamp apparatus 50 is actuated to urge the blinds into the tightly nested array shown in FIGS. 3 and 4. The cutter 60 is then actuated to urge the blade 62 into and through the slats 12 to define clean registered cuts having rounded corners adjacent the side edges of each slat 12. The cut thus defines trimmed second ends **16*a*, with the distance between the first end 14 and the trimmed second end 16*a*** equalling the width "b" as specified by the dimensions of the window for which the blinds are intended.

The preparation of the blinds 10 proceeds by presenting the blinds 10 to a router apparatus indicated generally by the numeral 70 in FIGS. 5–9. The router apparatus 70 is operative to precisely and cleanly cut second apertures in the slats 12 of the blinds 10 at a distance "c" from the trimmed second ends **16*a* of the respective slats. As shown most clearly in FIG. 5, the router apparatus 70 comprises a pair of substantially identical router subassemblies 72 which are simultaneously operable to cut apertures in two sets of blinds 10. It is to be understood, however, that the router apparatus 70 may be operated to precisely cut the apertures in only one venetian blind assembly 10**.

Each router subassembly 72 comprises a base 74 on which the blinds 10 may be supported. The base 74 includes an adjustably positionable stop 76 against which the trimmed second ends **16*a* are positioned. The distance from the stop 76 to the cutting portion of the router subassembly 72, as explained herein is selected to equal the distance "c" between the first ends 14 of the slats 12 and the first apertures 20**.

The router subassembly 72 further comprises a pair of parallel guides 78 and 80 which are spaced from one another by a distance substantially corresponding to the width of the slats 12 comprising the blinds 10. A clamp apparatus having a cylinder 82 with a piston rod 84 extending therefrom is disposed in proximity to the guides 78 and 80. A clamp 86 is disposed at the end of the piston rod 84 and defines a contoured clamping surface substantially corresponding to the arcuate cross-sectional configuration of the slats 12 comprising the blinds 10. As with the clamp 56 of the above described cutting apparatus 40, each clamp 86 of the routing apparatus 70 is operative to urge the slats 12 of the blinds 10 into a tightly nested stacked array, with the respective ends 14 and **16*a* of the slats 12 being registered with one another by the stop 76**.

Figure 7:
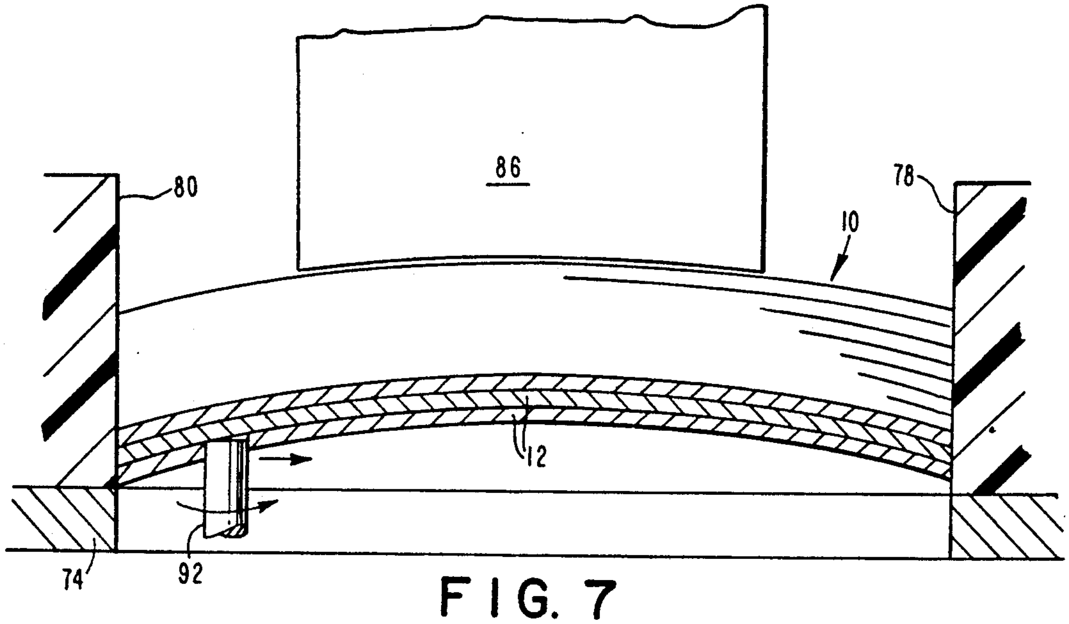
FIG. 7 is a cross-sectional view showing the routing apparatus in a first operational position.
Figure 8:
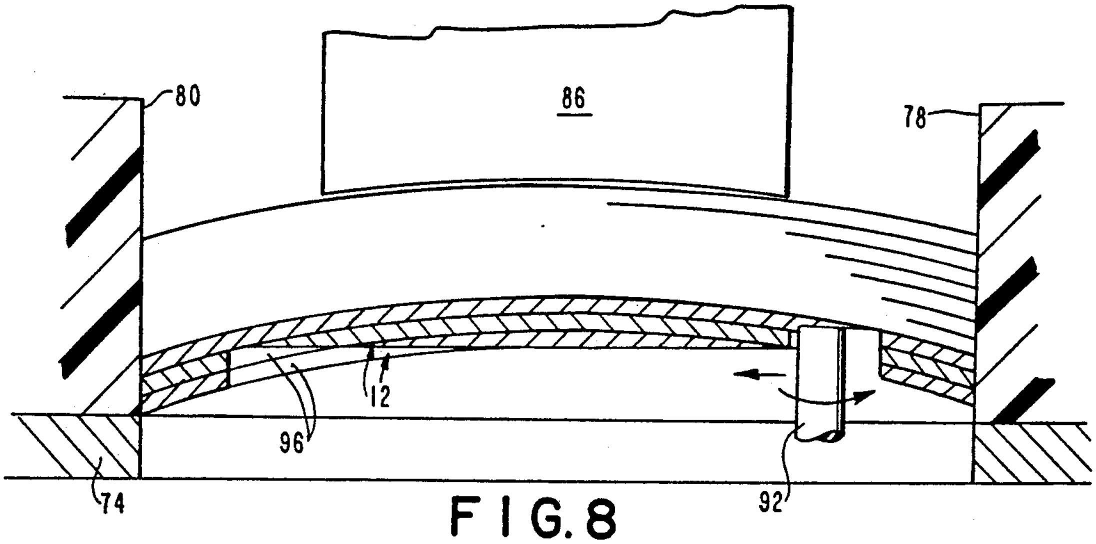
FIG. 8 is a cross-sectional view similar to FIG. 7 but showing the routing apparatus in a subsequent operational position.
Figure 9:
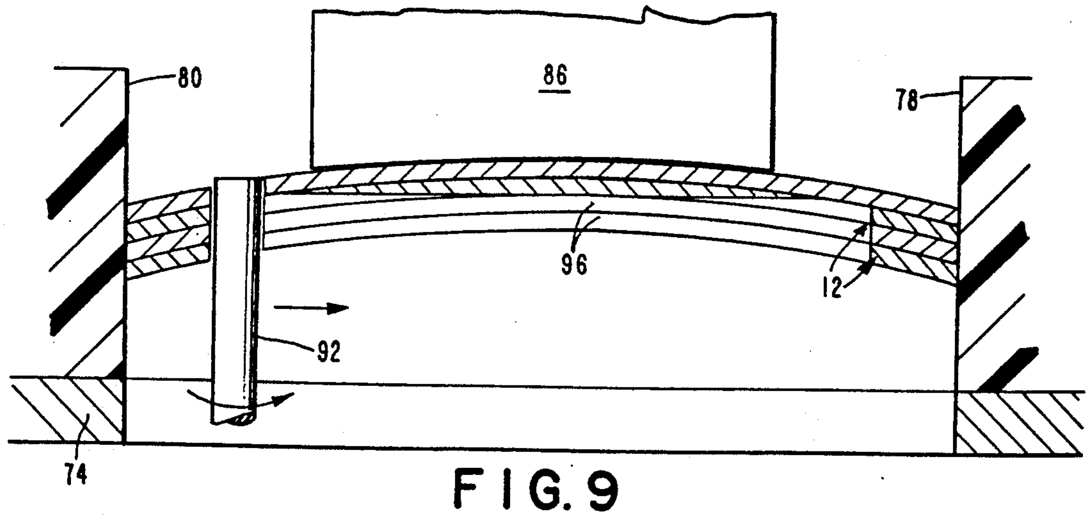
FIG. 9 is a cross-sectional view similar to FIGS. 7 and 8 but showing the apparatus in a later operational position.

Each routing subassembly 72 of the apparatus 70 further comprises a router 90 having a rotatable cutting bit 92 and having a preprogrammed cutting advance apparatus 94. In particular, the advance apparatus 94 is operative to move the router 90 and the rotatable cutting bit 92 thereof through a preselected pattern for precisely cutting apertures in the slats 12. More particularly, and with reference to FIGS. 7–9, the control apparatus 94 is operative to move the cutting bit 92 in an alternating side-to-side movement corresponding to the required width of the second apertures 96 to be cut in the slats 12. At the end of each transverse move of the cutting bit 92, the control apparatus 94 is operative to incrementally advance the router 90 and cutting bit 92 further into the tightly nested stacked array of slats 12. After the incremental advance into the slats 12 is completed, the cutting bit 92 will complete another transverse movement across the slats 12. As shown in FIGS. 7–9 the alternating transverse movement of the bit 92 does not follow the arched cross-sectional shape of the slats 12, but rather follows substantially linear movements. As a result, the bit 92 will not cut all of any one slat 12 during a single transverse movement. Rather, the router bit 92 will advance obliquely into the thin metal material from which the slats 12 are formed in cutting the respective second apertures. This oblique movement of the cutter bit 92 into the slats 12 combined with the tightly nested condition of the slats 12 caused by the clamp 86 substantially prevents burrs or other edge deformations adjacent the aperture 96, which would be more likely if the router bit 92 substantially followed the shape of the thin metal into which it was cutting.

After the apertures 96 have been formed in all of the slats 12, the control apparatus 94 is operative to withdraw the router 90 and the router bit 92 to a position below the base 74 of the apparatus 70. The piston rod 84 is then retracted into the cylinder 82 causing the clamp 86 to release its pressure on the slats 12 and enabling the slats 12 to be removed from the apparatus 70. At this point the slats 12 define lengths substantially corresponding to the specified width "b" for the blinds 10 to be mounted on the window. Additionally, the registered second apertures 96 are formed entirely through the metal slats 12 at a distance "c" from the trimmed second ends **16*a* of the slats 12. The blinds 10 can be completed by merely urging the interlace material 32 over the trimmed second ends 16*a* of the metal slats 12** and substantially in line with the second apertures 96 cut therein. The cord 32 can then be threaded through the apertures 96. The burr-free precisely formed second apertures 96 cut by the routing apparatus 70 prevent the cord 32 from snagging, fraying, or otherwise being caught on or damaged by portions of the slats 12 adjacent the apertures 96. The blinds 10 can be completed by merely connecting the ends of the first and second interlacing material supports 20 and 30 to the known controls in the channel 34 and by connecting the first and second pull cords 28 and 32 to one another in the known manner.

In summary, a method and apparatus are provided for completing sets of venetian blinds to specified dimensions at or in proximity to the point of purchase. The precisely dimensioned blinds may be formed from a kit comprising an array of slats having registered first apertures formed therethrough at a selected distance from the first end thereof, and having first interlaced supports and a first pull cord mounted thereto in the vicinity of the first apertures. The opposed second ends of the slats are free of apertures, and the slats define lengths equal to or greater than the required width of the blinds for a specified window. The blinds are made to the required dimension by first clamping the slats in a tightly nested stacked array in a cutting apparatus. The slats are trimmed to the required dimension at the second ends thereof, which, as noted above, are free of the apertures. The trimmed blinds are next presented to a routing apparatus for precisely cutting registered apertures at selected distances inwardly from the trimmed second ends. The routing apparatus includes a clamp to urge the slats into a tightly nested stacked array. The router is then controlled to alternately traverse across the slats and to incrementally advance between the sequential traversing movements of the router. The router is retracted and the clamp is released upon completion of the second apertures, and the properly trimmed slats with the registered apertures therein are removed from the routing apparatus. The blinds are completed by disposing the second interlaced supports over the trimmed second end and generally in line with the registered second apertures cut therein, and the second pull cords are inserted through the apertures. The interlace and the pull cords are then connected to control means in the channel of the blinds.

While the invention has been described with respect to certain preferred embodiments, it is apparent that various changes can be made without departing from the scope of the invention as defined by the appended claims.

What is claimed is:

1. An apparatus for forming elongated apertures in metal slats of venetian blinds, such that the apertures are substantially equally spaced from one end of each slat and generally in register with one another, said apparatus comprising:

a base for supporting the metal slats of the blinds;

a stop adjustably mounted to said base, said stop being dimensioned to permit the registration of the ends of the slats against the stop;

a pair of spaced apart substantially parallel guides extending from said base, the distance between said guides substantially corresponding to the width of the slats;

a clamp means for urging the slats of the blinds into a tightly nested stacked array intermediate the guides;

a routing apparatus mounted to said base for cutting the apertures in said metal slats, said routing apparatus comprising a rotatable cutting bit and control means for moving said cutting bit relative to said slats, said control means being operative to move said cutting bit through alternating traversing movements relative to said slats and for incrementally advancing said cutting bit into said array for slats after each traversing movement; and wherein the slats of the blind define an arcuate cross section along their respective lengths, said clamp means having an arcuate clamping surface substantially conforming to the arcuate cross-sectional configuration of the slats.

2. An apparatus as in claim 1 wherein the clamp apparatus is pneumatically operable.

* * * * *